Patented Mar. 6, 1928.

1,661,810

UNITED STATES PATENT OFFICE.

KENNETH P. MONROE, OF PENNS GROVE, NEW JERSEY, AND KI WILLIAMS, OF OLD HICKORY, TENNESSEE, ASSIGNORS TO E. I. DU PONT DE NEMOURS & COMPANY, OF WILMINGTON, DELAWARE, A CORPORATION OF DELAWARE.

PROCESS OF PRODUCING TETRA-ALKYL LEAD.

No Drawing. Application filed October 15, 1925. Serial No. 62,594.

This invention relates to the process of producing lead tetra-alkyl, particularly lead tetra-ethyl, by reaction between a lead-sodium alloy, an alkyl halide and a hydroxylic compound or mixture capable of reacting with the sodium with evolution of hydrogen in the presence of a catalyst of the type used in the Grignard synthesis.

The character of the hydroxylic compound or mixture of compounds is the aspect of the above outlined tetra-alkyl lead synthesis with which the present invention is chiefly concerned. Water and ethyl alcohol are good examples of substances which will react with sodium with formation of nascent hydrogen, and these substances can be used to a certain extent alternatively. The present invention, however, is concerned with the use of a hydroxylic mixture in which the alcohol predominates.

The synthesis of lead tetra-alkyls from lead sodium alloy and alkyl halide probably occurs in steps which may be represented by the following equations:

(1) $Pb + XAlk\ Hlg \rightarrow PbAlk_x Hlg_y$
(2) $Na + ROH \rightarrow NaOR + (H)$
(3) $PbAlk_x Hlg_y + (H) \rightarrow Pb(Alk)_2 + 2HHlg$
(4) $NaOR + HHlg \rightarrow NaHlg + ROH$
(5) $2Pb(Alk)_2 \rightarrow Pb(Alk)_4 + Pb$ This theory of the reaction is founded in part upon the observations that as the reactants are rigorously purified and the content of water, alcohol or other dissolved hydroxylic compound approaches zero as a limit, the yield of lead tetra-alkyl approaches zero as a limit also. On the other hand the presence of an excessive amount of alcohol, water or other dissolved hydroxylic compound is undesirable inasmuch as undue side reaction (for example, the evolution of hydrogen) follows, with corresponding loss.

It is therefore advantageous to control the violence of the side reaction. To accomplish this the alcohol content may be adjusted to the exigencies of the manufacturing program as disclosed in co-pending applications, or the violence of the side reaction may be mitigated by suitable dilution of the hydroxylic compound. In the case of water such dilution may be effected, as has already been pointed out in a co-pending application, by dissolving therein a salt.

It has now been ascertained, when the process is carried out with hydroxylic compound composed largely of alcohol, that it is advantageous to control the reaction by the gradual addition of a concentrated alcoholic solution of potassium hydroxide. This solution consisting of an equilibrium mixture of alcohol, water, potassium ethylate and potassium hydroxide is readily miscible with the alkyl halide and in this respect possesses an important advantage when the reaction is carried out on a large scale. To this property we ascribe tentatively, the fact that excellent yields of lead alkyl are obtained by the use of alcoholic potash even when no other catalytic agent of the type used in the Grignard synthesis is present.

Catalysts of this type which are especially suitable for use in this process are substances containing a tertiary basic nitrogen atom, for example, dimethylaniline, diethylaniline, pyridine, triethylamine, etc.

The following example is furnished as an illustration of our process only, and it is not our intention to limit ourselves to the proportions, temperatures, particular substances or other details therein indicated.

*Example.*

183 grams of lead-sodium alloy containing 16% sodium was added to a mixture of 250 cc. ethyl bromide, 10 cc. pyridine and 2.5 cc. 2B alcohol, contained in a 1 liter round flask fitted with a reflux condenser. The flask was immersed in a thermostat maintained at 40–45° C. and ½ cc. concentrated alcoholic potassium hydroxide solution added every 15 minutes, with vigorous shaking, for 16 hours. The excess ethyl bromide and lead tetra-ethyl were then separated by steam distillation.

In place of ethyl bromide we may use, for example, ethyl chloride. Where the product desired is some other lead-tetra alkyl than the ethyl alkyl, the corresponding alkyl halide should be employed. It is obvious that other concentrated alcoholic alkalies may be substituted for the alcoholic potash although it may be noted that among such that are commercially available, potassium hydroxide has the unique advantage of high basicity and high solubility in alcohol. Other variations from the process as illustrated, which are obvious to a chemist skilled in the art may be made without departing from the invention.

As has been noted in other co-pending applications, there is formed, in addition to lead tetra-ethyl, an appreciable amount of hexa-ethyl-di-plumbane when the process is carried out according to the specifications of this application. This may, however, be converted to lead tetra-ethyl by known methods.

We claim:

1. A process for the manufacture of tetra-alkyl lead from lead alloyed with a monovalent element capable of liberating hydrogen from alcohol which comprises treating such alloy with an alkyl halide and an alcoholic solution of potassium hydroxide.

2. The process of producing tetra-alkyl lead which comprises effecting a reaction between a lead-sodium alloy, an alkyl halide and a hydroxylic compound, in which process the hydroxylic compound comprises an alcoholic solution of an alkali.

3. In the process of producing tetra-alkyl lead which comprises effecting a reaction between an alloy of lead containing a monovalent element capable of liberating hydrogen from alcohol and an alkyl halide, the step of adding an alcoholic solution of an alkali.

4. The process of making a lead ethyl which comprises reacting a lead-sodium alloy with an ethylating agent in the presence of an alcoholic solution of an alkali.

5. The process in claim 4 in which the ethylating agent is an alkyl halide.

6. The process of producing tetra-alkyl lead which comprises treating an alloy of lead comprising a highly electro-positive metal under reaction conditions with an alkylating agent in the presence of an alcoholic solution of a caustic alkali.

7. The process of making a lead ethyl which comprises reacting a lead-sodium alloy with an ethyl halide in the presence of an alcoholic solution of an alkali.

8. The process of making tetra-ethyl lead which comprises reacting a lead-sodium alloy of the formula $PbNa_2$ with an ethyl halide in the presence of an alcoholic solution of potassium hydroxide.

9. The process as set forth in claim 8 in which the ethyl halide is ethyl bromide.

10. The process of producing tetra-ethyl lead which comprises treating lead alloyed with a monovalent element capable of liberating hydrogen from water under reaction conditions with an ethyl halide in the presence of an alcoholic solution of an alkali.

11. In the production of tetra-alkyl lead from an alloy of the formula $PbNa_2$, an alkyl halide and alcohol, the process of effecting control of the reaction between the sodium and the alcohol which comprises adding the alcohol as a concentrated alcoholic solution of an alkali.

12. The process of making a lead ethyl which comprises reacting a lead-sodium alloy with an ethylating agent in the presence of an alcoholic solution of an alkali and a substance containing a tertiary basic nitrogen atom, said substance being adapted to catalyze the reaction.

13. The process as set forth in claim 12, in which the substance containing a tertiary basic nitrogen atom is pyridine.

14. The process as set forth in claim 11, in which the alcoholic solution of an alkali is added in small batches at substantially regular intervals until the reaction is completed.

In testimony whereof we affix our signatures.

KENNETH P. MONROE.
KI WILLIAMS.